(12) United States Patent
Kim et al.

(10) Patent No.: US 12,365,273 B2
(45) Date of Patent: Jul. 22, 2025

(54) LUGGAGE GAP COVER DEVICE FOR VEHICLE REAR SEAT

(71) Applicants: Hyundai Motor Company, Seoul (KR); Kia Corporation, Seoul (KR); Hyundai Transys Inc., Seosan-si (KR)

(72) Inventors: Mu Young Kim, Osan-si (KR); Jun Young Yun, Osan-si (KR); Han Kyeol Cho, Seoul (KR); Ho Suk Jung, Hwaseong-si (KR); Sang Do Park, Suwon-si (KR); Chan Ho Jung, Gunpo-si (KR); Jun Hwan Lee, Seoul (KR); Dong Jin Kim, Anseong-si (KR); Hee Won Kwon, Hwaseong-si (KR); Jung Eun Kwon, Hwaseong-si (KR); Soo Yong Kim, Hwaseong-si (KR); Ye Eun Song, Suwon-si (KR); Jeong Su Yoon, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 161 days.

(21) Appl. No.: 18/310,928

(22) Filed: May 2, 2023

(65) Prior Publication Data

US 2024/0181943 A1    Jun. 6, 2024

(30) Foreign Application Priority Data

Dec. 5, 2022    (KR) .......................... 10-2022-0167949

(51) Int. Cl.
*B60N 2/36*    (2006.01)

(52) U.S. Cl.
CPC .......... *B60N 2/36* (2013.01); *B60N 2002/363* (2013.01)

(58) Field of Classification Search
CPC ................................................ B60N 2002/363
See application file for complete search history.

(56) References Cited

U.S. PATENT DOCUMENTS

| 3,011,822 | A | * | 12/1961 | May | B60N 2/3031 |
| | | | | | 296/66 |
| 6,113,187 | A | | 9/2000 | Sugiyama et al. | |
| 8,505,999 | B2 | * | 8/2013 | Whalen | B60N 2/36 |
| | | | | | 296/65.09 |
| 2005/0040689 | A1 | | 2/2005 | Henning | |
| 2017/0088027 | A1 | * | 3/2017 | Watanabe | B60N 2/36 |

(Continued)

FOREIGN PATENT DOCUMENTS

| CN | 1215673 A | 5/1999 |
| CN | 112208409 A | 1/2021 |

(Continued)

*Primary Examiner* — Timothy J Brindley
(74) *Attorney, Agent, or Firm* — Slater Matsil, LLP (57) ABSTRACT

An embodiment luggage gap cover device for a rear seat of a vehicle is provided. The rear seat includes an interlocking frame connecting a seatback of the rear seat to a seat cushion for a dive operation, and the luggage gap cover device includes a foldable cover mat on a rear surface of the seatback configured to cover a gap between the seatback and a floor plate of a luggage compartment and a support protrusion on the interlocking frame, the support protrusion being configured to push and support the cover mat in a direction of covering the gap between the seatback and the floor plate.

20 Claims, 11 Drawing Sheets

(56) References Cited

U.S. PATENT DOCUMENTS

| | | | |
|---|---|---|---|
| 2018/0281688 A1 | 10/2018 | Matsunami et al. | |
| 2019/0366899 A1* | 12/2019 | Valencia Flores | B60N 2/36 |
| 2021/0009014 A1 | 1/2021 | Kondo et al. | |
| 2021/0070200 A1 | 3/2021 | Jung et al. | |
| 2022/0089065 A1 | 3/2022 | Kim et al. | |
| 2023/0365036 A1* | 11/2023 | Ubale | B60N 2/6009 |

FOREIGN PATENT DOCUMENTS

| | | | | |
|---|---|---|---|---|
| DE | 102008025333 A1 * | 12/2009 | | B60N 2/06 |
| EP | 1498304 A2 * | 1/2005 | | B60N 2/06 |
| EP | 1854657 A2 * | 11/2007 | | B60N 2/06 |
| FR | 2962947 A1 * | 1/2012 | | B60N 2/3065 |
| JP | 2006327466 A | 12/2006 | | |
| JP | 2007091136 A * | 4/2007 | | |
| JP | 2014004881 A * | 1/2014 | | |
| WO | WO-2020183517 A1 * | 9/2017 | | B60N 2/36 |

\* cited by examiner

LUGGAGE GAP COVER DEVICE FOR VEHICLE REAR SEAT

CROSS-REFERENCE TO RELATED APPLICATIONS

This application claims the benefit of Korean Patent Application No. 10-2022-0167949, filed on Dec. 5, 2022, which application is hereby incorporated herein by reference.

TECHNICAL FIELD

The present invention relates to a luggage gap cover device for a vehicle rear seat.

BACKGROUND

Generally, a fold-and-dive seat is applied to a vehicle rear seat.

The fold-and-dive seat is a seat capable of performing a folding operation of folding a seatback of the rear seat over a seat cushion and a dive operation of lowering the front portion of the seat cushion so that the rear surface of the folded seatback is flush with the floor surface of a luggage compartment. This fold-and-dive seat is useful if storage space is not sufficient in the luggage compartment behind the rear seat or if a user wants to make the rear surface of the rear seat's seatback flush with the floor surface of the luggage compartment for a variety of space utilization.

Figure 1:
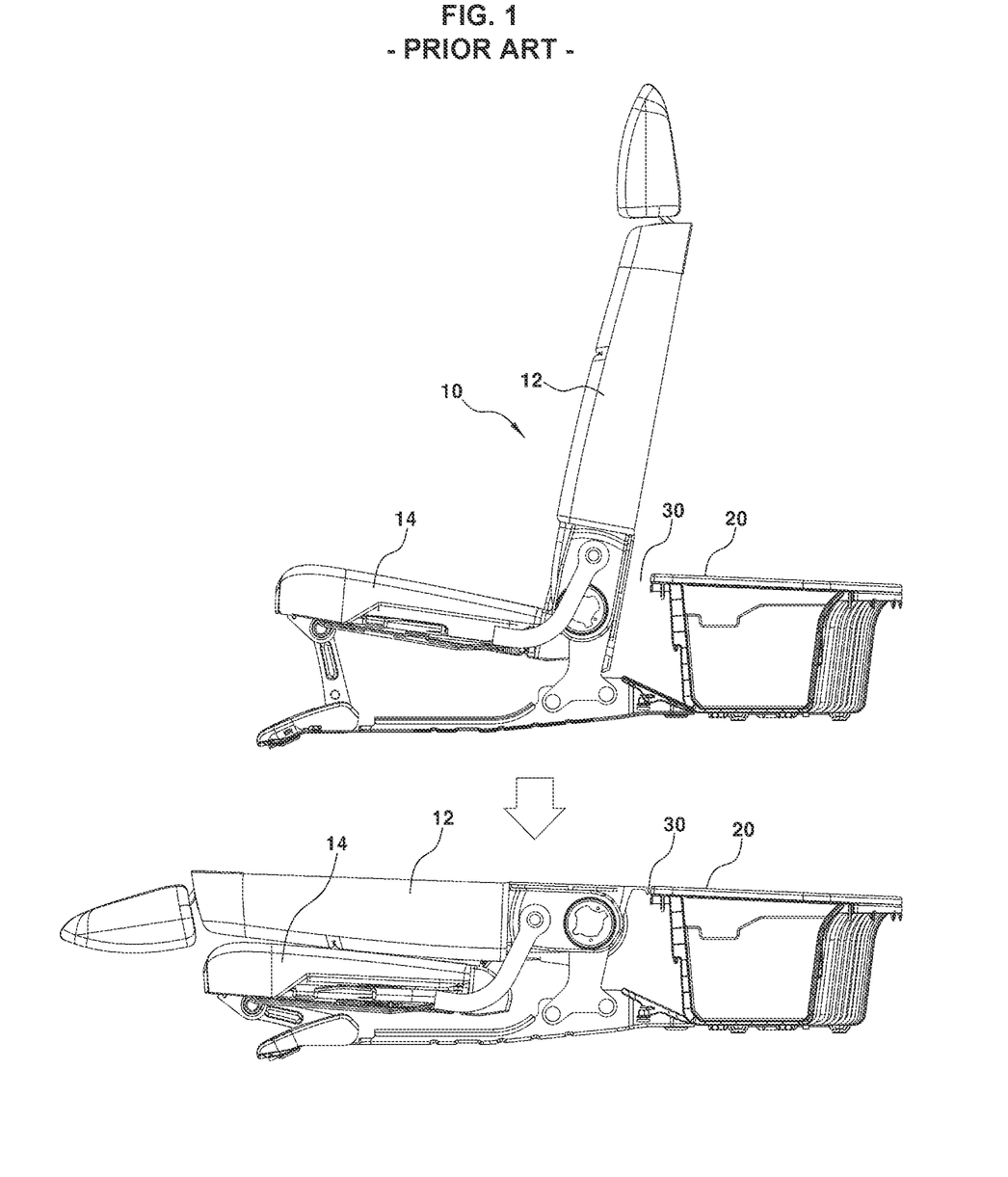
FIG. 1 is a side view showing an arrangement state between a rear seat, which is a fold-and-dive seat of the related art, and a floor plate of a luggage compartment.

FIG. 1 shows an arrangement state between a rear seat, which is a fold-and-dive seat in the related art, and a floor plate of a luggage compartment.

As shown in FIG. 1, in order to secure a rotational trajectory when a seatback 12 of a rear seat 10 is folded or unfolded, a minimum tuned gap 30 is provided between the rear surface of the seatback 12 and a floor plate 20 of the luggage compartment.

More specifically, before the seatback 12 of the rear seat 10 is folded (unfolded state), the minimum tuned gap 30 exists between the rear surface of the seatback 12 and the floor plate 20 of the luggage compartment, and after a folding operation of the seatback 12 and a dive operation of a seat cushion 14 are performed, the minimum tuned gap 30 also exists between the lower end of the rear surface of the seatback 12 and the floor plate 20 of the luggage compartment.

Accordingly, small objects and foreign substances may fall through the gap 30 to the bottom of a vehicle body, and there is a problem in that various kinds of dust and the like fall through the gap 30 and dust continuously settles on the floor of the vehicle body.

Figure 2:
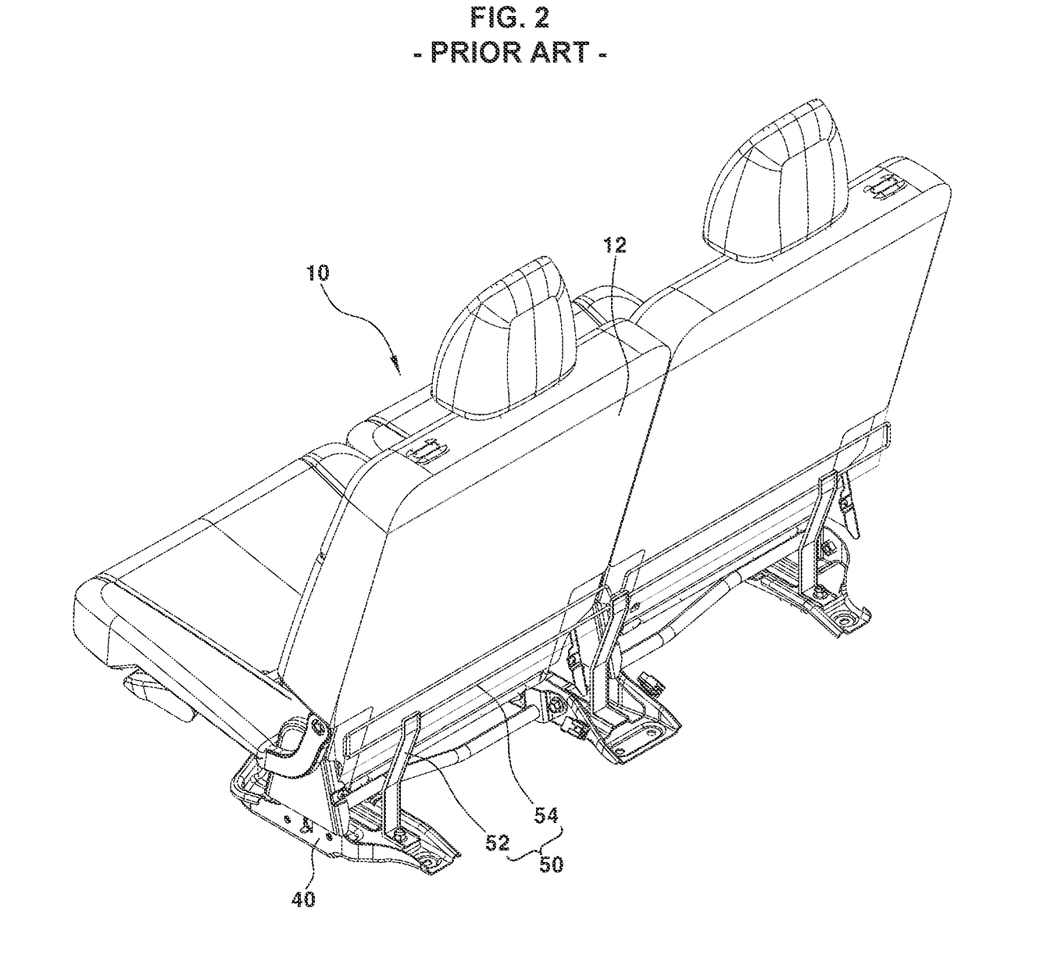
FIGS. 2 and 3 are perspective and side views showing a conventional gap cover device configured to cover a gap between the rear seat and the floor plate of the luggage compartment.
Figure 3:
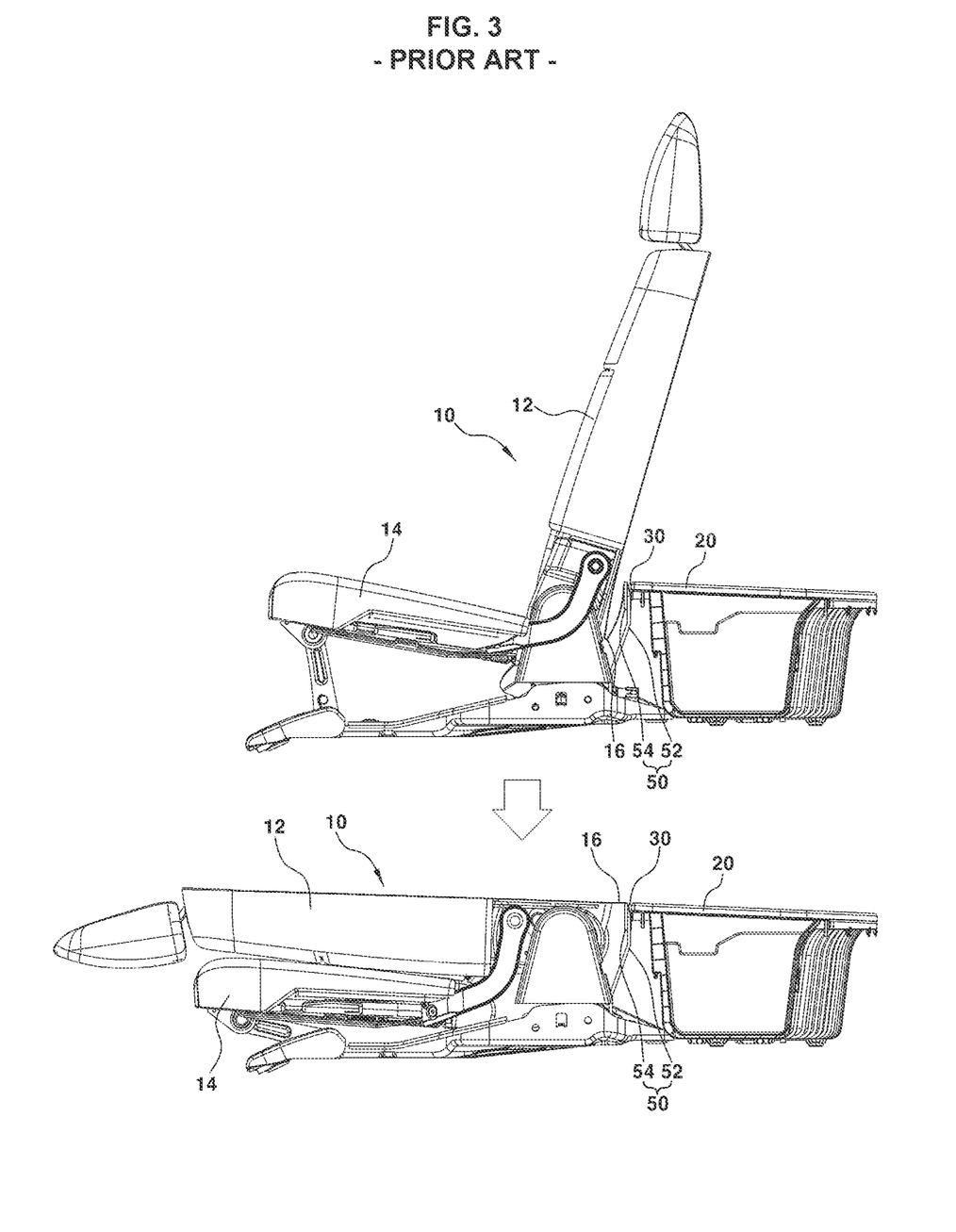

FIGS. 2 and 3 show a gap cover device of the related art.

As shown in FIGS. 2 and 3, as a conventional technique configured to cover the gap 30 between the seatback 12 of the rear seat 10, which is a fold-and-dive seat, and the floor plate 20 of the luggage compartment, a gap cover device 50 is mounted on a side frame 40 to which opposite sides of the lower end of the seatback 12 are rotatably connected.

The gap cover device 50 includes a plurality of support brackets 52 mounted on the side frame 40 and a wire 54 connected between the support brackets 52.

In this case, when a skirt 16, which is a kind of mat material, is attached to the rear surface of the seatback 12 of the rear seat 10, the lower end of the skirt 16 is extended and mounted on the wire 54 to be fixed thereto.

Accordingly, in the state in which the seatback 12 of the rear seat 10 is not folded (unfolded state), the skirt 16 mounted on and fixed to the wire 54 is in close contact with the floor plate 20 of the luggage compartment, thereby minimizing a gap between the rear surface of the seatback 12 and the floor plate 20 of the luggage compartment.

In addition, after the folding operation of the seatback 12 and the dive operation of the seat cushion 14 are performed, the skirt 16 mounted on and fixed to the wire 54 is tightened, and the same is in close contact with the floor plate 20 of the luggage compartment, thereby minimizing a gap between the lower end of the rear surface of the seatback 12 and the floor plate 20 of the luggage compartment.

Here, a gap cover device of the related art has an advantage of minimizing a gap between a seatback and a floor plate of a luggage compartment, but the same has a disadvantage of not being able to completely cover and eliminate the gap therebetween. Further, the gap cover device of the related art requires components such as a support bracket and a wire, which results in an increase in cost and an increase in weight.

The above information disclosed in this background section is only for enhancement of understanding of the background of embodiments of the invention, and therefore it may contain information that does not form the prior art that is already known to a person of ordinary skill in the art.

SUMMARY

The present invention relates to a luggage gap cover device for a vehicle rear seat. Particular embodiments relate to a luggage gap cover device for a vehicle rear seat capable of covering a gap between a rear seat and a floor plate of a luggage compartment.

Embodiments of the present invention can solve problems associated with the prior art, and an embodiment of the present invention provides a luggage gap cover device for a vehicle rear seat, including a support protrusion formed on an interlocking frame configured to connect a seatback frame of the rear seat to a seat cushion frame, an upper mat hinged to the rear surface of a seatback of the rear seat, and a lower mat fixedly mounted on the lower part of the seatback, thereby making it possible not only to cover a gap between the rear surface of the seatback and a floor plate of a luggage compartment by allowing the support protrusion to push the upper mat rearward in a state in which the seatback is not folded (unfolded state), but also to cover a gap between the seatback and the floor plate of the luggage compartment by the lower mat after a folding operation of the seatback and a dive operation of a seat cushion are performed.

One embodiment of the present invention provides a luggage gap cover device for a vehicle rear seat including an interlocking frame configured to connect a seatback of a rear seat to a seat cushion for a dive operation, wherein the seatback has, in order to cover a gap between the seatback and a floor plate of a luggage compartment, an upper mat having one end hinged to a rear surface thereof and a lower mat fixedly mounted on a lower part thereof, and the interlocking frame has a support protrusion formed thereon, the support protrusion being configured to push and support the upper mat in a direction of covering the gap.

In a preferred embodiment, the support protrusion may be integrally formed to protrude from a rear end of the interlocking frame hinged to the seatback in a rearward direction.

In another preferred embodiment, the interlocking frame may be provided in a curved structure so as to connect the seatback of the rear seat to the seat cushion.

In still another preferred embodiment, the interlocking frame may have a front end connected to a side of a seat cushion frame serving as a skeleton of the seat cushion and a rear end hinged to a side of a seatback frame serving as a skeleton of the seatback.

In yet another preferred embodiment, when the support protrusion of the interlocking frame pushes the upper mat in a rearward direction in a state in which folding of the seatback is not performed, the upper mat may be disposed in contact with a surface of the floor plate while covering a gap between the rear surface of the seatback and the floor plate of the luggage compartment.

In still yet another preferred embodiment, the upper mat may be in close contact with the rear surface of the seatback after a folding operation of the seatback and the dive operation of the seat cushion are performed, and simultaneously, the lower mat may be disposed to cover the gap between the seatback and the floor plate of the luggage compartment.

In a further preferred embodiment, the upper mat may have an auxiliary mat further hinged to the other end serving as a free end of the upper mat and configured to be in surface contact with the floor plate.

Another embodiment of the present invention provides a luggage gap cover device for a vehicle rear seat, including an interlocking frame configured to connect a seatback of a rear seat to a seat cushion for a dive operation, wherein the seatback has, in order to cover a gap between the seatback and a floor plate of a luggage compartment, an upper mat having one end hinged to a rear surface thereof and a lower mat fixedly mounted on a lower part thereof, and the interlocking frame has a frame cover configured to cover a surface thereof, the frame cover having a support protrusion formed thereon, the support protrusion being configured to push and support the upper mat in a direction of covering the gap.

In a preferred embodiment, the support protrusion may be integrally formed to protrude from a rear end of the frame cover hinged to the seatback in a rearward direction.

In another preferred embodiment, the interlocking frame may be provided in a curved structure so as to connect the seatback of the rear seat to the seat cushion.

In still another preferred embodiment, the interlocking frame covered by the frame cover may have a front end connected to a side of a seat cushion frame serving as a skeleton of the seat cushion and a rear end hinged to a side of a seatback frame serving as a skeleton of the seatback.

In yet another preferred embodiment, when the support protrusion of the frame cover pushes the upper mat in a rearward direction in a state in which folding of the seatback is not performed, the upper mat may be disposed in contact with a surface of the floor plate while covering a gap between the rear surface of the seatback and the floor plate of the luggage compartment.

In still yet another preferred embodiment, the upper mat may be in close contact with the rear surface of the seatback after a folding operation of the seatback and a dive operation of the seat cushion are performed, and simultaneously, the lower mat may be disposed to cover the gap between the seatback and the floor plate of the luggage compartment.

In a further preferred embodiment, the upper mat may have an auxiliary mat further hinged to the other end serving as a free end of the upper mat and configured to be in surface contact with the floor plate.

Other features of preferred embodiments of the invention are discussed infra.

It is understood that the terms "vehicle", "vehicular", and other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter reference will be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 4:
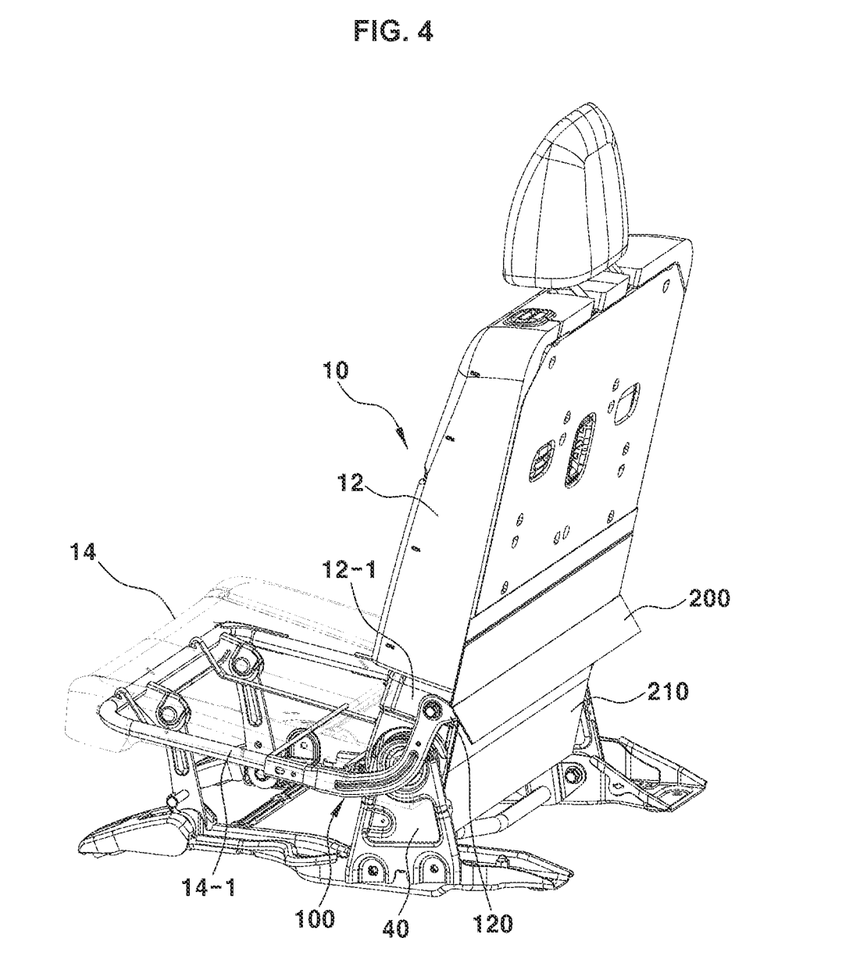
FIG. 4 is a perspective view showing a luggage gap cover device for a vehicle rear seat according to an embodiment of the present invention.

FIG. 4 is a perspective view showing a luggage gap cover device for a vehicle rear seat according to an embodiment of the present invention.

As shown in FIG. 4, a seatback 12 of a rear seat 10 is rotatably hinged to a side frame 40 connected to the bottom of a vehicle body, and an interlocking frame 100 for a dive operation of a seat cushion 14 connects the seatback 12 to the seat cushion 14.

The interlocking frame 100 is provided in a curved structure so as to connect the side of the seatback 12 to the side of the seat cushion 14.

That is, the interlocking frame 100 is provided with a curved structure bent at a predetermined angle. Here, the interlocking frame 100 has a front end fixedly connected to the side of the seat cushion 14 and a rear end hinged to the side of the seatback 12.

More specifically, the front end of the interlocking frame 100 is connected to the side of a seat cushion frame 14-1, which is a skeleton of the seat cushion 14, and the rear end of the interlocking frame 100 is hinged to the side of a seatback frame 12-1, which is a skeleton of the seatback 12.

Figure 6:
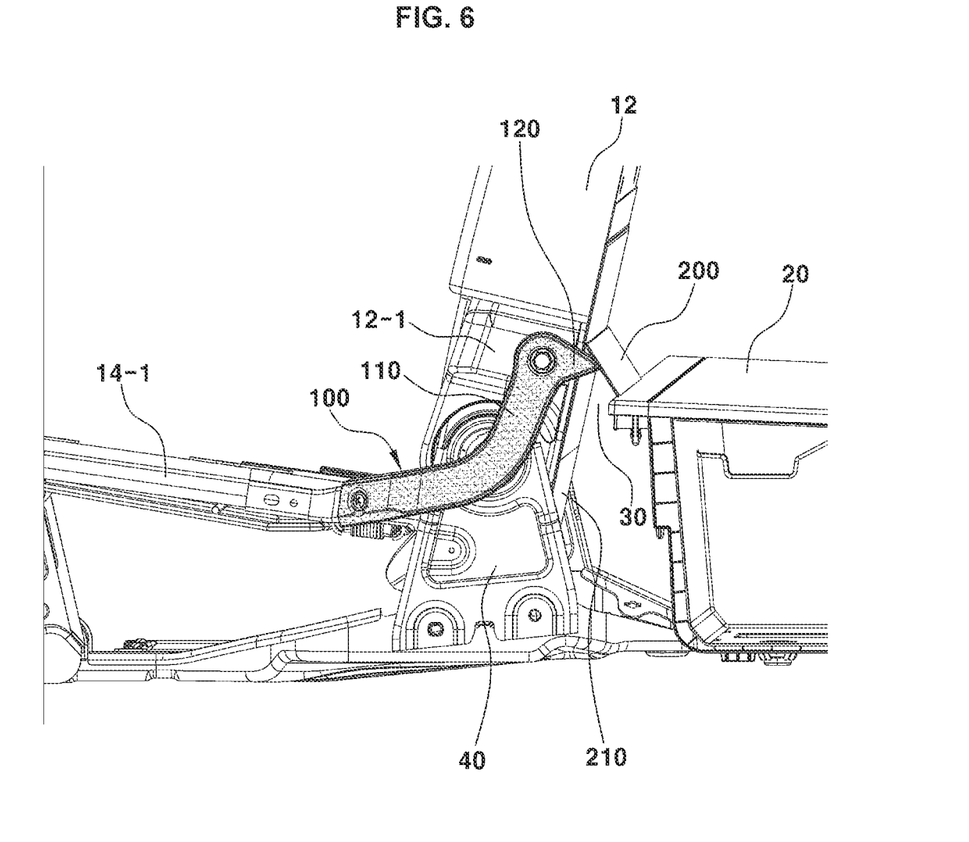
FIGS. 6 to 9 are perspective views showing the operating state of the luggage gap cover device for the vehicle rear seat according to embodiments of the present invention.

Referring to FIGS. 4 and 6, as a cover mat configured to cover a gap 30 between the rear surface of the seatback 12 and a floor plate 20 of a luggage compartment, one end of an upper mat 200 is hinged to the rear surface of the seatback 12, and a lower mat 210 is fixedly mounted on the lower end of the rear surface of the seatback 12.

In this case, the other end, which is the free end of the upper mat 200, is in a state of being freely rotatable around one end of the upper mat 200 hinged to the seatback 12.

According to an embodiment of the present invention, a support protrusion 120 configured to push and support the upper mat 200 in a direction of covering the gap 30 is integrally formed to protrude from the interlocking frame 100.

Preferably, the support protrusion 120 is integrally formed to protrude from the rear end of the interlocking frame 100 hinged to the seatback frame 12-1 in the rearward direction in which the gap 30 is located.

Therefore, in the state in which folding of the seatback 12 is not performed (standard position state in which an occupant may sit), the support protrusions 120 of the interlocking frame 100 respectively push and support the opposite ends of the upper mat 200 in the rearward direction. Accordingly, as shown in FIG. 6, the other end, which is the free end of the upper mat 200, is rotated rearward around one end of the upper mat 200 hinged to the seatback 12, and the other end of the upper mat 200 covers the gap 30 between the rear surface of the seatback 12 and the floor plate 20 of the luggage compartment. In this manner, the other end of the upper mat 200 may be disposed to be in line contact with the surface of the floor plate 20.

Meanwhile, after the folding operation of the seatback 12 and the dive operation of the seat cushion 14 are performed, the support protrusions 120 of the interlocking frame 100 do not respectively contact the opposite ends of the upper mat 200. Accordingly, while the upper mat 200 is in close contact with the rear surface of the seatback 12 by its own weight, the lower mat 210 may be horizontally disposed to cover the gap 30 between the seatback 12 and the floor plate 20 of the luggage compartment.

Figure 5:
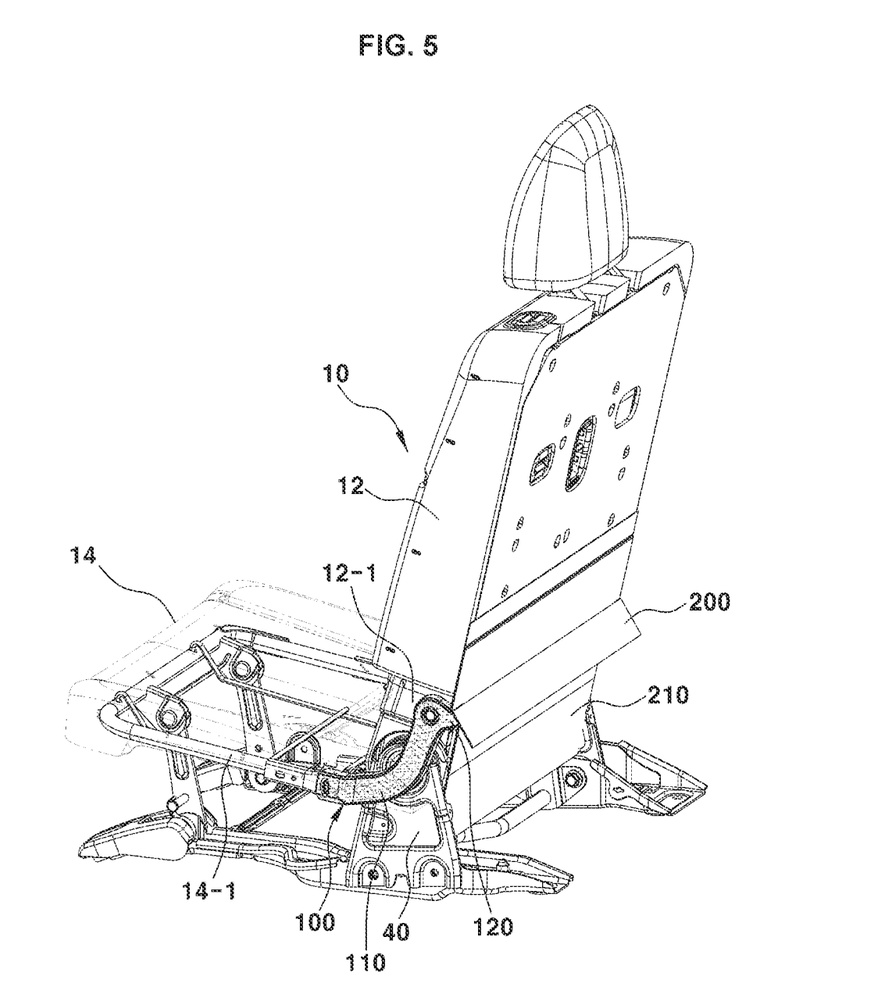
FIG. 5 is a perspective view showing a luggage gap cover device for a vehicle rear seat according to another embodiment of the present invention.

FIG. 5 is a perspective view showing a luggage gap cover device for a vehicle rear seat according to another embodiment of the present invention.

As shown in FIG. 5, the seatback 12 of the rear seat 10 is rotatably mounted on a side frame 40 connected to the bottom of the vehicle body, and the interlocking frame 100 for a dive operation of the seat cushion 14 connects the seatback 12 to the seat cushion 14. Further, a frame cover 110 made of plastic covers the surface of the interlocking frame 100.

In this case, the interlocking frame 100 is made of a metal material such as steel, and if the metallic interlocking frame 100 is exposed as it is, the same may corrode, or injury to an occupant may occur when the metallic interlocking frame directly contacts an occupant. For this reason, the frame cover 110 made of plastic covers the surface of the interlocking frame 100.

Preferably, the frame cover 110 may cover the surface of the interlocking frame 100 by an injection molding method of the related art.

Since the interlocking frame 100 is provided in a curved structure so as to connect the side of the seatback 12 to the side of the seat cushion 14, the frame cover 110 also has a curved structure.

In the same manner as that of the above-described embodiment, the front end of the interlocking frame 100 covered by the frame cover 110 is connected to the side of the seat cushion frame 14-1, which is a skeleton of the seat cushion 14, and the rear end of the interlocking frame 100 covered by the frame cover 110 is hinged to the side of the seatback frame 12-1, which is a skeleton of the seatback 12.

Referring to FIGS. 5 and 6, as a cover mat configured to cover the gap 30 between the rear surface of the seatback 12 and the floor plate 20 of the luggage compartment, one end of the upper mat 200 is hinged to the rear surface of the seatback 12, and the lower mat 210 is fixedly mounted on the lower end of the rear surface of the seatback 12.

In this case, the other end, which is the free end of the upper mat 200, is in a state of being freely rotatable around one end of the upper mat 200 hinged to the seatback 12.

According to another embodiment of the present invention, the support protrusion 120 configured to support and push the upper mat 200 in the direction of covering the gap 30 is integrally formed to protrude from the frame cover 110 covering the interlocking frame 100.

Preferably, the support protrusion 120 is integrally formed to protrude from the rear end of the frame cover 110 hinged to the seatback frame 12-1 in the rearward direction in which the gap 30 is located.

Therefore, in the state in which folding of the seatback 12 is not performed (standard position state in which an occupant may sit), the support protrusions 120 of the interlocking frame 100 respectively push and support the opposite ends of the upper mat 200 in the rearward direction. Accordingly, as shown in FIG. 6, the other end, which is the free end of the upper mat 200, is rotated rearward around one end of the upper mat 200 hinged to the seatback 12, and the other end of the upper mat 200 covers the gap 30 between the rear surface of the seatback 12 and the floor plate 20 of the luggage compartment. In this manner, the other end of the upper mat 200 may be disposed to be in line contact with the surface of the floor plate 20.

Meanwhile, after the folding operation of the seatback 12 and the dive operation of the seat cushion 14 are performed, the support protrusions 120 of the frame cover 110 do not respectively contact the opposite ends of the upper mat 200. Accordingly, while the upper mat 200 is in close contact with the rear surface of the seatback 12 by its own weight, the lower mat 210 may be horizontally disposed to cover the gap 30 between the seatback 12 and the floor plate 20 of the luggage compartment.

Figure 10:
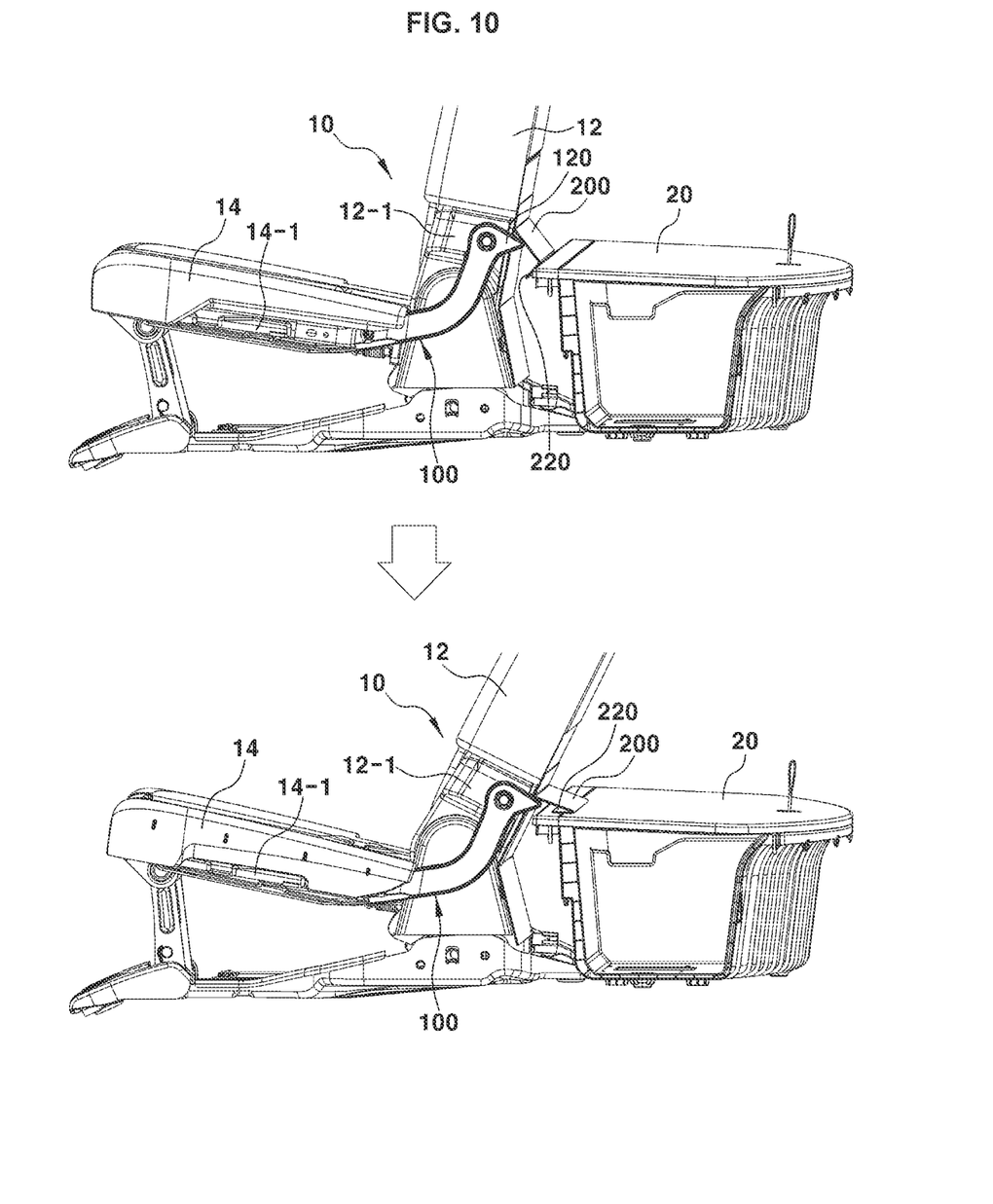
FIG. 10 is a perspective view showing a luggage gap cover device for a vehicle rear seat according to still another embodiment of the present invention.

Meanwhile, as still another embodiment of the present invention, as shown in FIG. 10, an auxiliary mat 220 configured to be in surface contact with the surface of the floor plate 20 is further hinged to the other end, which is the free end of the upper mat 200, thereby making it possible to more stably maintain the arrangement of the upper mat 200 covering the gap 30.

Here, the operating state of the luggage gap cover device of embodiments of the present invention based on the above-described configuration will be described with reference to FIGS. 6 to 9.

FIG. 6 is a side view showing a state in which the seatback of the rear seat is placed in a pre-folding position (standard position) at which an occupant may lean his or her back against the seatback.

As shown in FIG. 6, in the state in which folding of the seatback 12 is not performed (standard position at which an occupant may sit), when the support protrusions 120 formed on the interlocking frame 100 or the frame cover 110 respectively push and support the opposite ends of the upper mat 200 in the rearward direction, the other end, which is the free end of the upper mat 200, is rotated rearward around one end of the upper mat 200 hinged to the seatback 12, and the same is disposed to be in line contact with the surface of the floor plate 20. Accordingly, the gap 30 between the rear surface of the seatback 12 and the floor plate 20 of the luggage compartment may be reliably covered by the upper mat 200.

Figure 7:
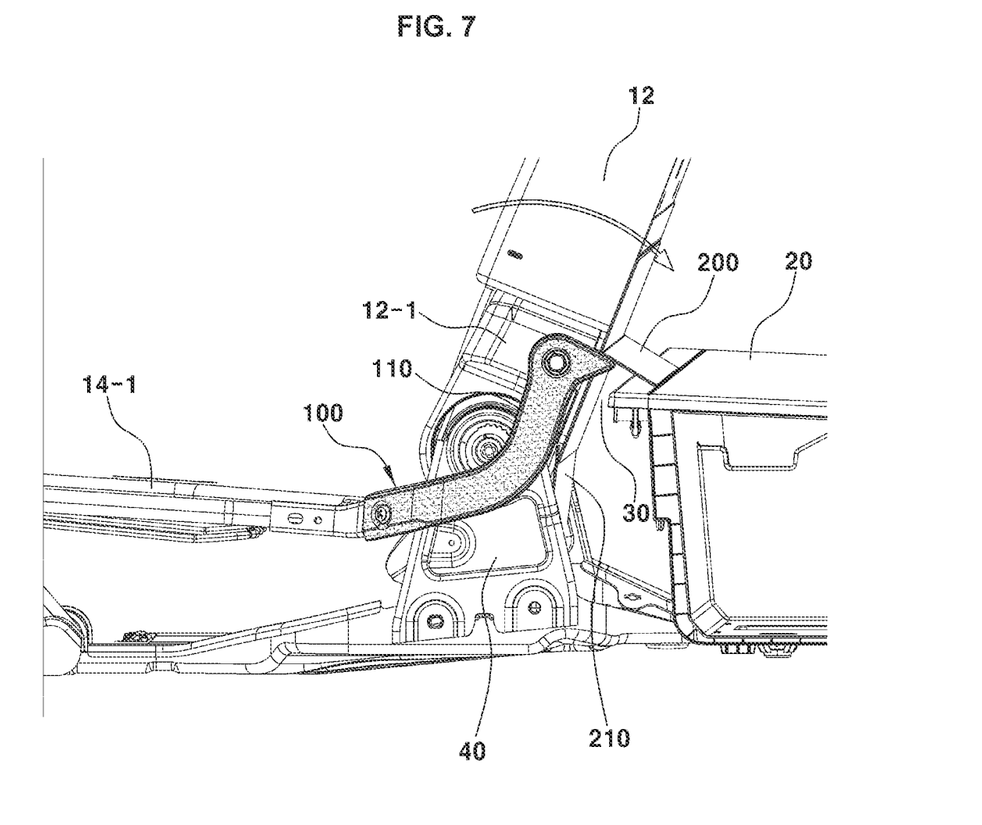

FIG. 7 is a side view showing a state in which the seatback of the rear seat is reclined rearward.

Even if the seatback 12 is reclined rearward, as shown in FIG. 7, the other end, which is the free end of the upper mat 200, is further rotated rearward around one end of the upper mat 200 hinged to the seatback 12, and the same is disposed to be in line contact with the surface of the floor plate 20, thereby making it possible to reliably cover the gap 30 between the rear surface of the seatback 12 and the floor plate 20 of the luggage compartment by the upper mat 200.

Figure 8:
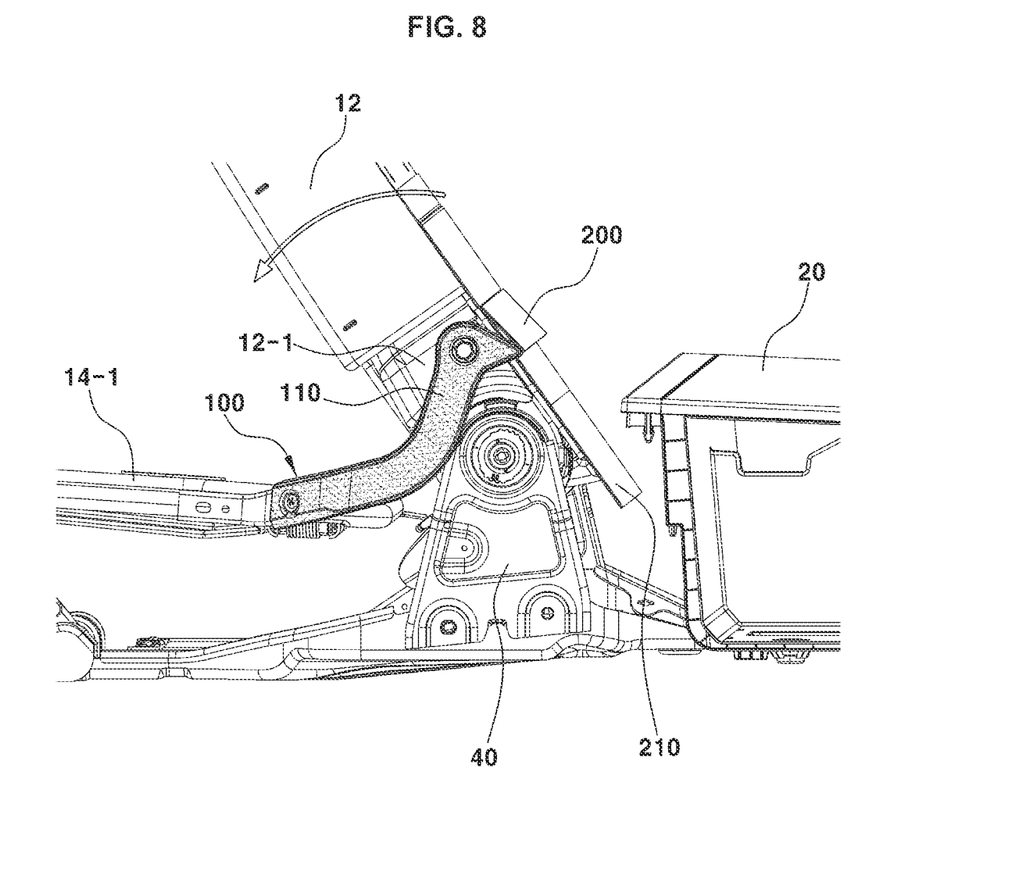
Figure 9:
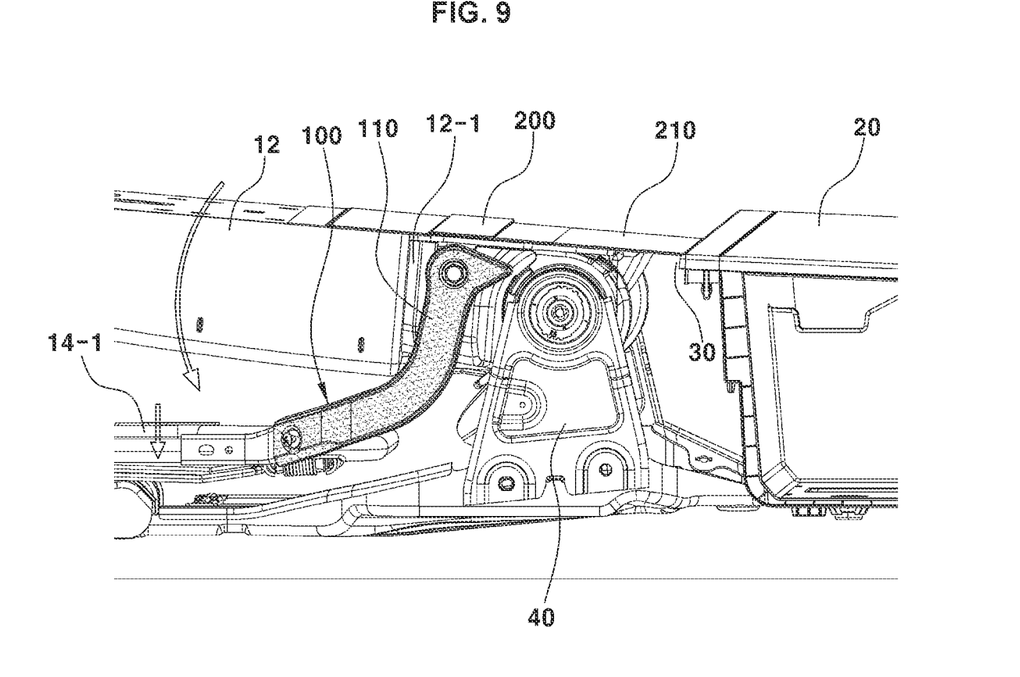

FIG. 8 is a side view showing a state in which the seatback of the rear seat is in the middle of being folded forward, and FIG. 9 is a side view showing a state in which the seatback of the rear seat is completely folded forward and the dive operation of the seat cushion is performed.

When the seatback 12 is folded around a hinge point of the side frame 40, the interlocking frame 100 pushes the seat cushion 14 downward, and the dive operation of the seat cushion 14 is performed.

That is, when the seatback 12 is folded around the hinge point of the side frame 40, a hinge fastening point between the side of the seatback 12 and the rear end of the interlocking frame 100 is moved along a folding trajectory of the seatback, and simultaneously, the front end of the interlocking frame 100 pushes the seat cushion 14 downward, thereby performing the dive operation of the seat cushion 14.

In this case, even if the seatback 12 is in the middle of being folded or is completely folded, the support protrusion 120 formed on the interlocking frame 100 or the frame cover 110 is continuously maintained in the state of protruding in the rearward direction.

Accordingly, after the folding operation of the seatback 12 and the dive operation of the seat cushion 14 are completed, as shown in FIG. 9, the support protrusions 120 formed on the interlocking frame 100 or the frame cover 110 are continuously maintained in the state of protruding in the rearward direction so as not to respectively contact the opposite ends of the upper mat 200. Accordingly, the upper mat 200 is in close contact with the rear surface of the seatback 12 by its own weight.

Simultaneously, when the folding of the seatback 12 is completed, the lower mat 210 fixedly mounted on the lower end of the rear surface of the seatback 12 is arranged to be flush with the floor plate 20 of the luggage compartment, thereby covering the gap 30.

In this manner, the gap 30 between the seatback 12 and the floor plate 20 of the luggage compartment is covered by the upper mat 200 or the lower mat 210, thereby making it possible not only to improve the appearance of the luggage compartment, but also to reliably prevent small objects, foreign substances, and dust from settling on the floor of the vehicle body through the gap 30.

Meanwhile, although the above-described cover mat has a structure including two or more pieces such as an upper mat and a lower mat, the cover mat may be formed as a single mat.

Figure 11:
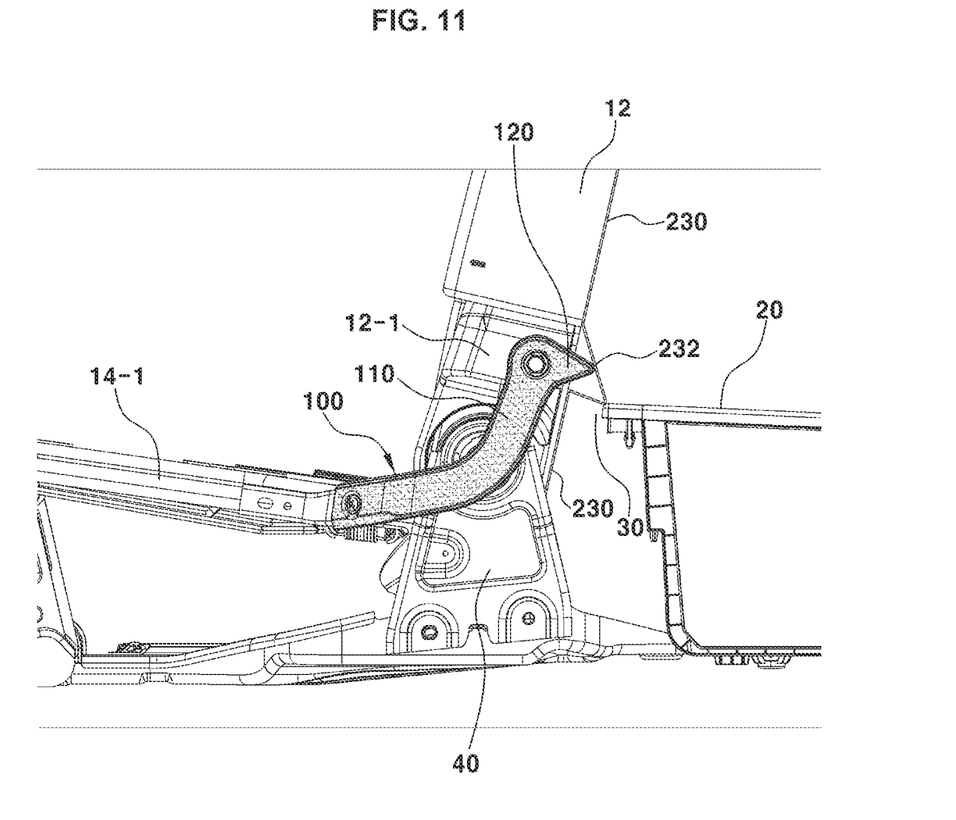
FIG. 11 is a side view showing an example in which a cover mat of the luggage gap cover device for the vehicle rear seat according to embodiments of the present invention is formed as a single mat.

FIG. 11 is a side view showing an example in which the cover mat of the luggage gap cover device for the vehicle rear seat according to embodiments of the present invention is formed as a single mat.

As shown in FIG. 11, the cover mat may be formed as a single mat and may include a fixed mat part 230 attached and fixed to the rear surface of the seatback 12 and a folding mat part 232 formed to be foldable while having an extra vertical length at a part of the vertical length section of the fixed mat part 230, wherein the folding mat part 232 is not attached to the rear surface of the seatback 12. The folding mat part 232 covers the gap 30 while being pushed rearward by the support protrusion 120.

Accordingly, when the support protrusions 120 formed on the interlocking frame 100 or the frame cover 110 push and support the opposite ends of the folding mat part 232 in the rearward direction, the folding mat part 232 is pushed rearward and disposed to be in line contact with the surface of the floor plate 20, thereby making it possible to reliably cover the gap 30 between the rear surface of the seatback 12 and the floor plate 20 of the luggage compartment by the folding mat part 232.

As is apparent from the above description, embodiments of the present invention provide the following effects.

First, in the state in which folding of a seatback is not performed (unfolded state), a support protrusion formed on an interlocking frame or a frame cover pushes an upper mat rearward to support the same, and the upper mat contacts the surface of a floor plate of a luggage compartment, thereby making it possible to cover a gap between the rear surface of the seatback and the floor plate of the luggage compartment by the upper mat.

Second, after a folding operation of the seatback and a dive operation of the seat cushion are performed, a lower mat fixed to the lower part of the seatback may cover a gap between the seatback and the floor plate of the luggage compartment.

Third, the gap between the seatback and the floor plate of the luggage compartment is covered by the upper or lower mat, thereby making it possible to prevent small objects, foreign substances, and dust from settling on the floor of a vehicle body.

Fourth, the gap between the seatback and the floor plate of the luggage compartment is covered by the upper or lower mat, thereby achieving cost reduction and weight reduction compared to a conventional gap cover device including parts such as a support bracket and a wire.

The invention has been described in detail with reference to preferred embodiments thereof. However, it will be appreciated by those skilled in the art that changes may be made in these embodiments without departing from the principles and spirit of the invention, the scope of which is defined in the appended claims and equivalents thereto.

What is claimed is:

1. A luggage gap cover device for a seat of a vehicle, the luggage gap cover device comprising:
an interlocking frame connecting a seatback of the seat to a seat cushion of the seat for a dive operation;
a foldable cover mat on a rear surface of the seatback configured to cover a gap between the seatback and a floor plate of a luggage compartment, wherein the cover mat comprises an upper mat having a first end hinged to the rear surface of the seatback and a lower mat fixedly mounted on a lower part of the seatback; and
a support protrusion on the interlocking frame, the support protrusion being configured to push and support the cover mat in a direction of covering the gap between the seatback and the floor plate.

2. The luggage gap cover device of claim 1, wherein, in a state in which the support protrusion of the interlocking frame pushes the upper mat in a rearward direction in a state in which the seatback is not folded, the upper mat is in contact with a surface of the floor plate while covering the gap between the seatback and the floor plate.

3. The luggage gap cover device of claim 1, wherein, in a state following a folding operation of the seatback and the dive operation of the seat cushion, the upper mat is in close contact with the rear surface of the seatback and the lower mat covers the gap between the seatback and the floor plate.

4. The luggage gap cover device of claim 1, further comprising an auxiliary mat hinged to a second end of the upper mat and configured to be in surface contact with the floor plate.

5. The luggage gap cover device of claim 1, wherein the support protrusion is integrally formed to protrude from a rear end of the interlocking frame hinged to the seatback in a rearward direction.

6. The luggage gap cover device of claim 1, wherein the interlocking frame has a curved shape so as to connect the seatback of the rear seat to the seat cushion.

7. The luggage gap cover device of claim 1, wherein:
a front end of the interlocking frame is connected to a side of a seat cushion frame configured as a skeleton of the seat cushion; and
a rear end of the interlocking frame is hinged to a side of a seatback frame configured as a skeleton of the seatback.

8. The luggage gap cover device of claim 1, wherein the cover mat comprises a single mat, the single mat comprising a fixed mat part attached to the rear surface of the seatback and a folding mat part configured to be foldable while having an extra vertical length at a part of a vertical length section of the fixed mat part, the folding mat part not being attached to the rear surface of the seatback.

9. The luggage gap cover device of claim 8, wherein the folding mat part covers the gap in a state of being pushed rearward by the support protrusion.

10. A luggage gap cover device for a rear seat of a vehicle, the luggage gap cover device comprising:
an interlocking frame connecting a seatback of the seat to a seat cushion of the seat for a dive operation;
an upper mat having a first end hinged to a rear surface of the seatback;
a lower mat fixedly mounted on a lower part of the seatback;
a frame cover covering a surface of the interlocking frame; and
a support protrusion on the frame cover, wherein the support protrusion is configured to push and support the upper mat in a direction of covering a gap between the seatback and a floor plate of a luggage compartment.

11. The luggage gap cover device of claim 10, wherein the support protrusion is integrally formed to protrude from a rear end of the frame cover hinged to the seatback in a rearward direction.

12. The luggage gap cover device of claim 10, wherein the interlocking frame has a curved shape so as to connect the seatback of the rear seat to the seat cushion.

13. The luggage gap cover device of claim 10, wherein:
a front end of the interlocking frame covered by the frame cover is connected to a side of a seat cushion frame configured as a skeleton of the seat cushion; and
a rear end of the interlocking frame covered by the frame cover is hinged to a side of a seatback frame configured as a skeleton of the seatback.

14. The luggage gap cover device of claim 10, wherein, in a state in which the support protrusion of the frame cover pushes the upper mat in a rearward direction in a state in which the seatback is not folded, the upper mat is in contact with a surface of the floor plate while covering the gap between the seatback and the floor plate.

15. The luggage gap cover device of claim 10, wherein, in a state following a folding operation of the seatback and the dive operation of the seat cushion, the upper mat is in close contact with the rear surface of the seatback and the lower mat covers the gap between the seatback and the floor plate.

16. The luggage gap cover device of claim 10, further comprising an auxiliary mat hinged to a second end of the upper mat and in surface contact with the floor plate.

17. A vehicle comprising:
a vehicle body comprising a luggage compartment;
a seat mounted in an interior of the vehicle body in front of the luggage compartment in a front-to-back direction of the vehicle body, the seat comprising a seatback, a seat cushion, and an interlocking frame connecting the seatback to the seat;
a cover mat on a rear surface of the seatback, wherein the cover mat is configured to cover a gap between the seatback and a floor plate of the luggage compartment, wherein the cover mat comprises an upper mat having a first end hinged to the rear surface of the seatback and a lower mat fixedly mounted on a lower part of the seatback; and
a support protrusion on the interlocking frame, the support protrusion being configured to push and support the cover mat in a direction of covering the gap between the seatback and the floor plate.

18. The vehicle of claim 17, wherein:
in a state in which the support protrusion of the interlocking frame pushes the upper mat in a rearward direction in a state in which the seatback is not folded, the upper mat is in contact with a surface of the floor plate while covering the gap between the seatback and the floor plate; and in a state following a folding operation of the seatback and a dive operation of the seat cushion, the upper mat is in close contact with the rear surface of the seatback and the lower mat covers the gap between the seatback and the floor plate.

19. The vehicle of claim 18, further comprising an auxiliary mat hinged to a second end of the upper mat and configured to be in surface contact with the floor plate.

20. A luggage gap cover device for a rear seat of a vehicle comprising:
   an interlocking frame connecting a seatback of the rear seat to a seat cushion for a dive operation;
   a foldable cover mat on a rear surface of the seatback configured to cover a gap between the seatback and a floor plate of a luggage compartment; and
   a support protrusion on the interlocking frame, the support protrusion being configured to push and support the cover mat in a direction of covering the gap between the seatback and the floor plate,
   wherein the seatback of the rear seat is rotatably hinged to a side frame of the rear seat,
   wherein a front end of the interlocking frame is connected to a side of a seat cushion frame configured as a skeleton of the seat cushion, and
   wherein a rear end of the interlocking frame is hinged to a side of a seatback frame configured as a skeleton of the seatback.

* * * * *

UNITED STATES PATENT AND TRADEMARK OFFICE
CERTIFICATE OF CORRECTION

PATENT NO. : 12,365,273 B2
APPLICATION NO. : 18/310928
DATED : July 22, 2025
INVENTOR(S) : Kim et al.

Page 1 of 1

It is certified that error appears in the above-identified patent and that said Letters Patent is hereby corrected as shown below:

In the Claims

In Column 9, in Claim 6, Line 50, after "of the" delete "rear".

In Column 10, in Claim 10, Line 1, after "for a" delete "rear".

In Column 10, in Claim 12, Line 21, after "of the" delete "rear".

Signed and Sealed this
Twenty-sixth Day of August, 2025

Coke Morgan Stewart
*Acting Director of the United States Patent and Trademark Office*